Patented Nov. 26, 1935

2,021,902

UNITED STATES PATENT OFFICE 2,021,902

CELLULOSE MIXED AND HIGHER ESTER COMPOSITIONS CONTAINING TRIALKYL PHOSPHATES

Henry B. Smith, Rochester, N. Y., assignor to Eastman Kodak Company, Rochester, N. Y., a corporation of New York No Drawing. Application October 21, 1932, Serial No. 638,998

11 Claims. (Cl. 106—40)

This invention relates ot plasticizers for mixed and higher organic esters of cellulose, such, for instance, as cellulose acetate-propionate, cellulose acetate-butyrate, cellulose propionate, cellulose butyrate and the like. An object of the invention is to provide cellulose mixed and higher ester compositions from which flexible sheets and other useful plastic products may be made. Another object is to provide flexible sheets of cellulose mixed and higher esters, such as are useful for photographic film, wrapping sheets, etc. Another object is to provide cellulose mixed and higher ester compositions which are capable of being molded at elevated temperatures and high pressures to produce molded objects having desirable properties.

Cellulose acetate-propionate has become known only within the last few years, and the field of plasticizers for it and for other mixed and higher esters of cellulose is, as yet, substantially unexplored. Fully esterified cellulose acetate-propoinate, acetate-butyrate, etc., may be prepared as described in Clarke and Malm's U. S. Patent 1,800,860. The preparation of partially hydrolyzed cellulose acetate-propionate and other mixed esters, i. e., cellulose acetate-propionate from which a portion of the acyl groups has been hydrolyzed off, is described in the co-pending application of Carl J. Malm and Charles F. Fletcher Serial No. 551,546. Cellulose acetate-stearate may be prepared as described in the co-pending application of Hans T. Clarke and Carl J. Malm Serial No. 520,150.

In my co-pending application Serial No. 501,667, I have described generically the application of the lower trialkyl phosphates as plasticizers for all organic esters of cellulose. The present application deals with certain of these organic esters more specifically, namely, the mixed and higher organic esters, such as those mentioned above.

The mixed and higher organic esters of cellulose have properties differing from those of cellulose acetate. For instance, propylene chloride and ethylene chloride, which alone are not solvents for cellulose acetate—either unhydrolyzed or partially hydrolyzed—readily dissolve a majority of these cellulose mixed esters (whether fully esterified or partially hydrolyzed), and sheets coated from such solutions, even without a plasticizer, show fair flexibility, as is disclosed in the co-pending application of Carl J. Malm Serial No. 551,545. Furthermore, acetone is a solvent for unhydrolyzed or fully esterified cellulose acetate-propionate, although sheets coated from such solutions are brittle, whereas unhydrolyzed cellulose acetate is not soluble in acetone.

I have discovered that the lower trialkyl phosphates and in particular tributyl phosphate, are good plasticizers for cellulose acetate-propionate and other mixed and higher organic esters of cellulose, such, for instance, as cellulose acetate-butyrate, cellulose propionate, cellulose butyrate, etc. They will also plasticize the higher esters of greater molecular weight, such as cellulose acetate-stearate and cellulose stearate, although a plasticizer is not always necessary therewith.

In order that those skilled in the art may better understand my invention I would state, by way of illustration, that for the manufacture of photographic film or other sheets my new compositions of matter may be compounded as follows: 100 parts of unhydrolyzed cellulose acetate-propionate having an acetyl content of 30% and a propionyl content of 16%, approximately, is dissolved with stirring in 300 to 500 parts, preferably 400 parts, by weight of ethylene chloride. To this solution may be added from 10 to 80 parts by weight of tributyl phosphate. In place of tributyl phosphate, any of the other lower trialkyl phosphates may be used. By the term "lower trialkyl phosphates" I mean those trialkyl phosphates having less than six carbon atoms in the alkyl group. Within the limits stated, the amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency and very low inflammability, burning even less readily than ordinary newsprint. Films or sheets produced in accordance with my invention are tough and flexible, and maintain flexibility in a superior fashion. For instance, films of unhydroylzed cellulose acetate-propionate plasticized with 25% (25 parts by weight based on the cellulose acetate) of tributyl phosphate, deposited from solution in ethylene chloride, withstood 27 folds on the modified Schopper fold-tester, and still showed good flexibility at the end of 200 days in an oven maintained at 65° C., whereas a film containing no plasticizer, also coated from solution in ethylene chloride, withstood only 8 folds on the fold-tester and was brittle at the end of 58 days in the 65° C. oven. Films of unhydrolyzed cellulose acetate-propionate plasticized with 25% of tributyl phosphate, deposited from solution in acetone, withstood 10 folds on the modified Schopper fold-tester, and maintained flexibility in the 65° C. oven for as long as 100 days, whereas an unplasticized film deposited from acetone solution was too brittle to fold at all, even before being exposed to a temperature of 65° C.

Films of hydrolyzed cellulose acetate-propionate containing from 30 to 50% (parts by weight based on the cellulose ester) of tributyl phosphate and coated from solution in a mixture of 90% ethylene chloride and 10% ethyl alcohol showed good flexibility. Films of cellulose acetate-butyrate containing 25% of tributyl phosphate, deposited from solution in a mixture of 90% ethylene chloride and 10% methyl alcohol, withstood 25 folds on the fold-tester and still showed good flexibility at the end of 193 days in the 65° C. oven. Films of cellulose acetate-butyrate containing 25% of tributyl phosphate and deposited from solution in acetone withstood 20 folds on the fold-tester and showed good flexibility at the end of 193 days in the 65° C. oven, whereas an unplasticized film deposited from acetone was brittle to start with. Other mixed and higher organic esters of cellulose showed results similar to those obtained with cellulose acetate-propionate and cellulose acetate-butyrate.

All of this indicates that films of mixed and higher organic esters of cellulose plasticized with the lower trialkyl phosphates, particularly tributyl phosphate, will withstand ordinary usage satisfactorily for many years. Other solvents which are compatible with the cellulose ester being used and with the trialkyl phosphate may be employed instead of those mentioned above.

While I have described the manufacture of films and sheets from my new compositions, it will be apparent that they may be employed with advantage in the other branches of the plastic art, such as in the manufacture of lacquers and of artificial silk.

The lower trialkyl phosphates may also be advantageously used as plasticizers in cellulose mixed and higher ester molding compositions. For instance, when about 30% (30 parts by weight based on the cellulose ester) of tributyl phosphate is homogeneously mixed with cellulose acetate-propionate, either hydrolyzed or unhydrolyzed, the mixture may be converted into a hard, transparent or translucent plastic product by molding at a temperature of 120°–150° C. and a pressure of 2500 to 4000 pounds per square inch for a period of from 2 to 5 minutes, in a manner already known to those skilled in molding cellulose ester compositions.

While I have mentioned certain percentages as suitable for film manufacture and for molding, I have found that tributyl phosphate is compatible with cellulose acetate-propionate to the extent of about 80% of the weight of the cellulose ester.

While I have mentioned cellulose acetate-propionate, cellulose acetate-butyrate, cellulose propionate and cellulose butyrate as examples of the mixed and higher organic esters of cellulose with which I may employ the trialkyl phosphates as plasticizers, it will be understood that my invention is not limited to these specific esters. For instance, I may employ these plasticizers advantageously even with cellulose acetate-stearate and others of the higher molecular weight mixed organic esters of cellulose.

What I claim as my invention and desire to be secured by Letters Patent of the United States is:

1. A composition of matter comprising an organic acid ester of cellulose containing an acyl group having more than two carbon atoms, and tributyl phosphate.

2. A composition of matter comprising a mixed organic acid ester of cellulose containing an acyl group having more than two carbon atoms, and tributyl phosphate.

3. A composition of matter comprising cellulose acetate-propionate and tributyl phosphate.

4. A composition of matter comprising 100 parts of cellulose acetate-propionate and from about 10 to 80 parts, by weight, of tributyl phosphate.

5. A transparent, flexible sheet comprising an organic acid ester of cellulose containing an acyl group having more than two carbon atoms, and tributyl phosphate as a plasticizer for the cellulose ester.

6. A transparent, flexible sheet comprising a mixed organic acid ester of cellulose containing an acyl group having more than two carbon atoms, and tributyl phosphate as a plasticizer for the cellulose ester.

7. A transparent, flexible sheet comprising cellulose acetate-propionate and tributyl phosphate as a plasticizer therefor.

8. A transparent, flexible sheet comprising 100 parts of cellulose acetate-propionate and from about 10 to 80 parts of tributyl phosphate.

9. A molding composition adapted for molding under elevated temperatures and high pressures, comprising an organic acid ester of cellulose containing an acyl group having more than two carbon atoms, and tributyl phosphate.

10. A molding composition adapted for molding under elevated temperatures and high pressures, comprising a mixed organic acid ester of cellulose containing an acyl group having more than two carbon atoms, and tributyl phosphate.

11. A molding composition adapted for molding under elevated temperatures and high pressures, comprising cellulose acetate-propionate and tributyl phosphate.

HENRY B. SMITH.